(12) United States Patent
Lin

(10) Patent No.: US 9,229,184 B2
(45) Date of Patent: Jan. 5, 2016

(54) LENS MODULE

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 156 days.

(21) Appl. No.: 14/029,751

(22) Filed: Sep. 17, 2013

(65) Prior Publication Data

US 2014/0341508 A1    Nov. 20, 2014

(30) Foreign Application Priority Data

May 14, 2013  (TW) .............. 102116951 A

(51) Int. Cl.
*G02B 6/32* (2006.01)
*G02B 6/36* (2006.01)
*G02B 6/42* (2006.01)

(52) U.S. Cl.
CPC ............ *G02B 6/4292* (2013.01); *G02B 6/4214* (2013.01); *G02B 6/4231* (2013.01); *G02B 6/322* (2013.01)

(58) Field of Classification Search
CPC ... G02B 6/4214; G02B 6/4231; G02B 6/4292
USPC ........................................ 385/33, 93
See application file for complete search history.

(56) References Cited

U.S. PATENT DOCUMENTS

| 8,335,411 B2 * | 12/2012 | Kuznia et al. ........ 385/33 |
| 2012/0008901 A1 * | 1/2012 | Yu et al. ........ 385/74 |
| 2014/0099057 A1 * | 4/2014 | Sun et al. ........ 385/33 |

* cited by examiner

*Primary Examiner* — Ryan Lepisto
(74) *Attorney, Agent, or Firm* — Novak Druce Connolly Bove + Quigg LLP

(57) ABSTRACT

A lens module includes a front lens unit and a bottom lens unit. The front lens unit includes a number of first lenses having parallel optical axes. The bottom lens unit is detachably connected to the front lens unit. The bottom lens unit includes a number of second lenses having parallel optical axes.

3 Claims, 7 Drawing Sheets

LENS MODULE

BACKGROUND

1. Technical Field

The present disclosure relates to a lens module.

2. Description of Related Art

Lens modules are used in optical-electric convertors. The lens module can be either a refractive-type lens module or a direct-type lens module. In refractive-type lens modules, light is bent 90 degrees. In direct type lens modules, the light directly passes through.

Refractive-type lens modules achieve a small size, but are difficult to manufacture. The direct-type lens modules are easily manufactured, but are bigger than the refractive-type lens modules.

Therefore, it is desirable to provide a lens module that can overcome the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
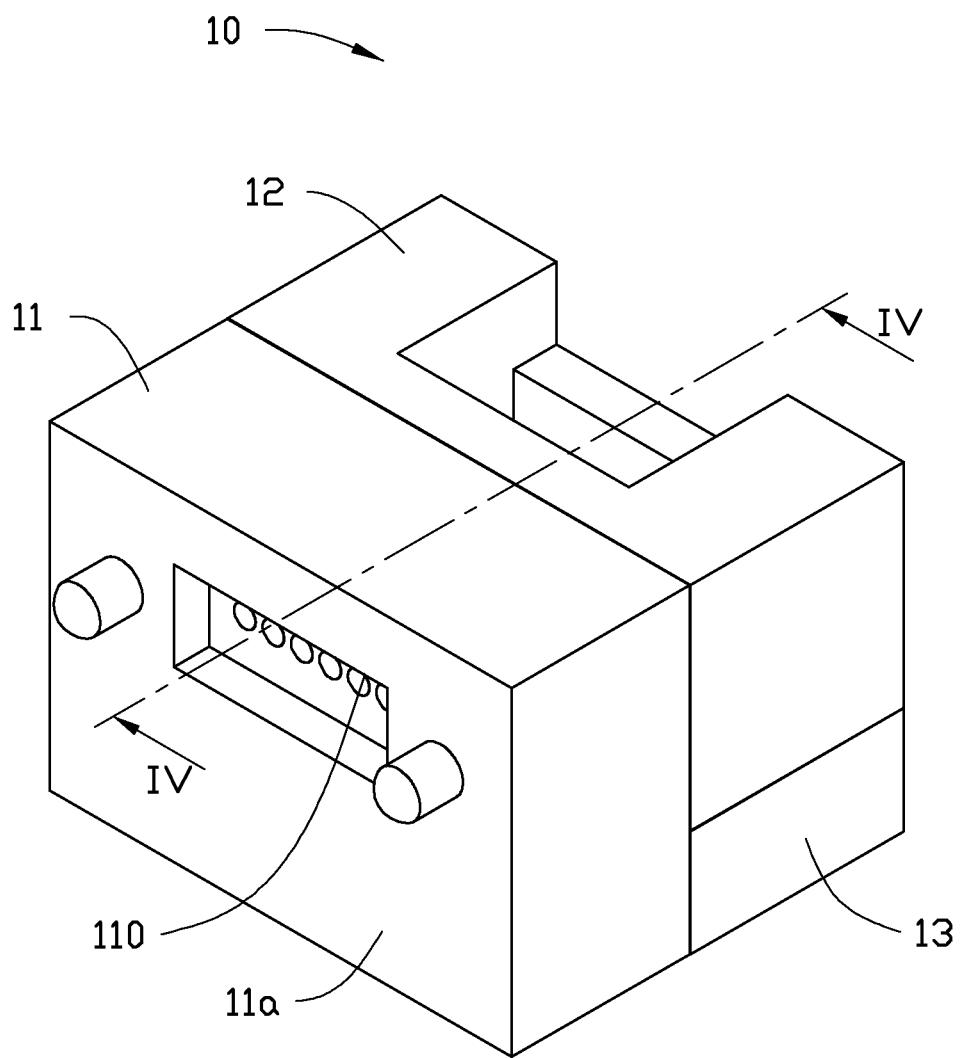
FIG. 1 is an assembled schematic view of a lens module, according to an exemplary embodiment.
Figure 2:
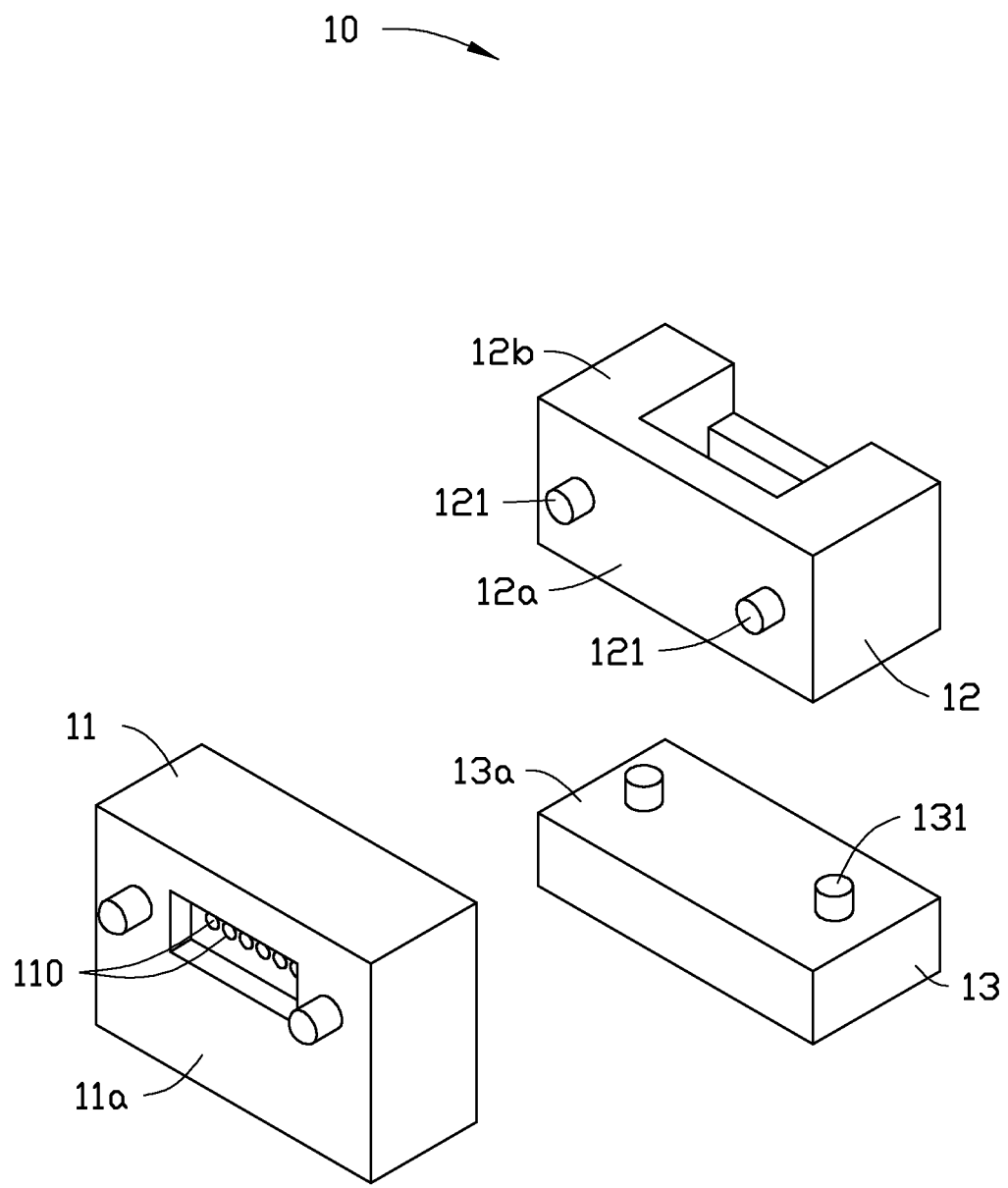
FIG. 2 is an explosive view of FIG. 1.
Figure 3:
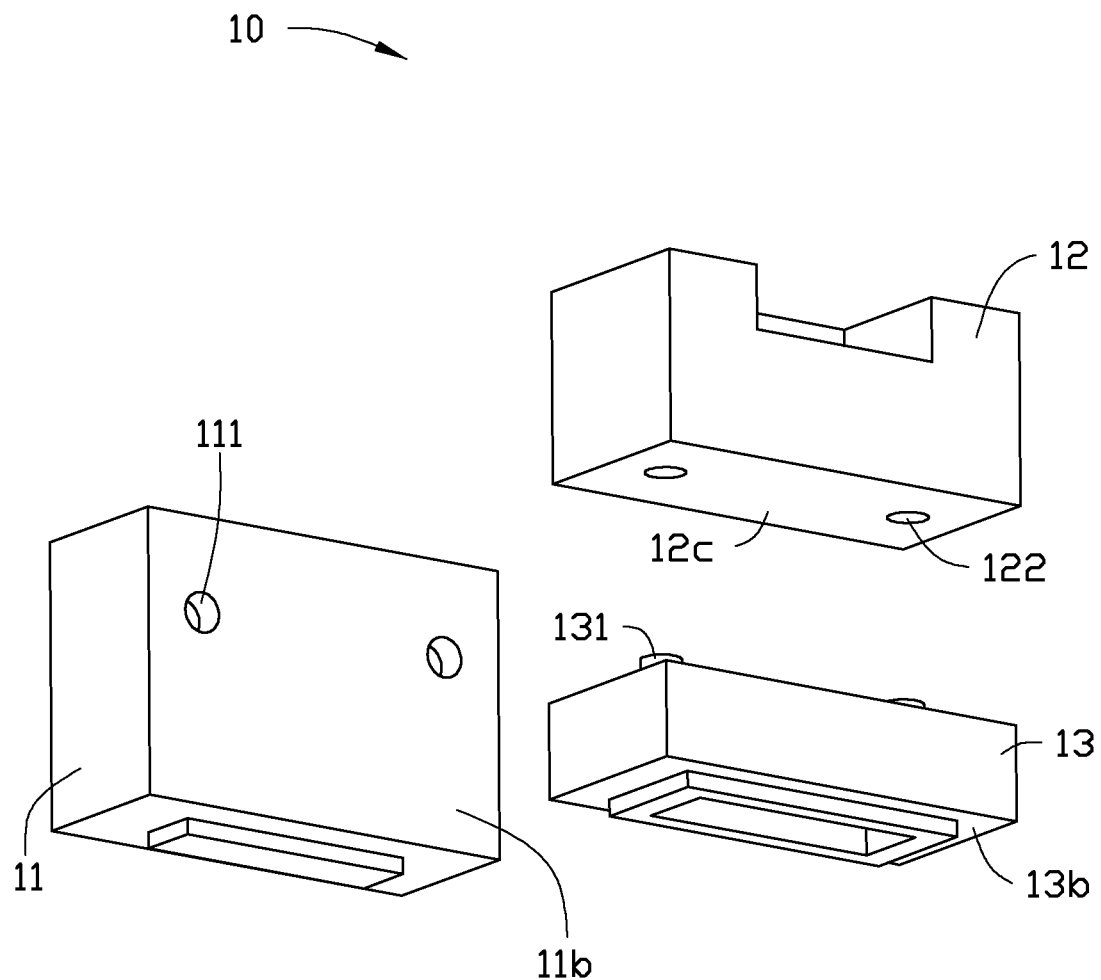
FIG. 3 is another explosive view of FIG. 1.
Figure 4:
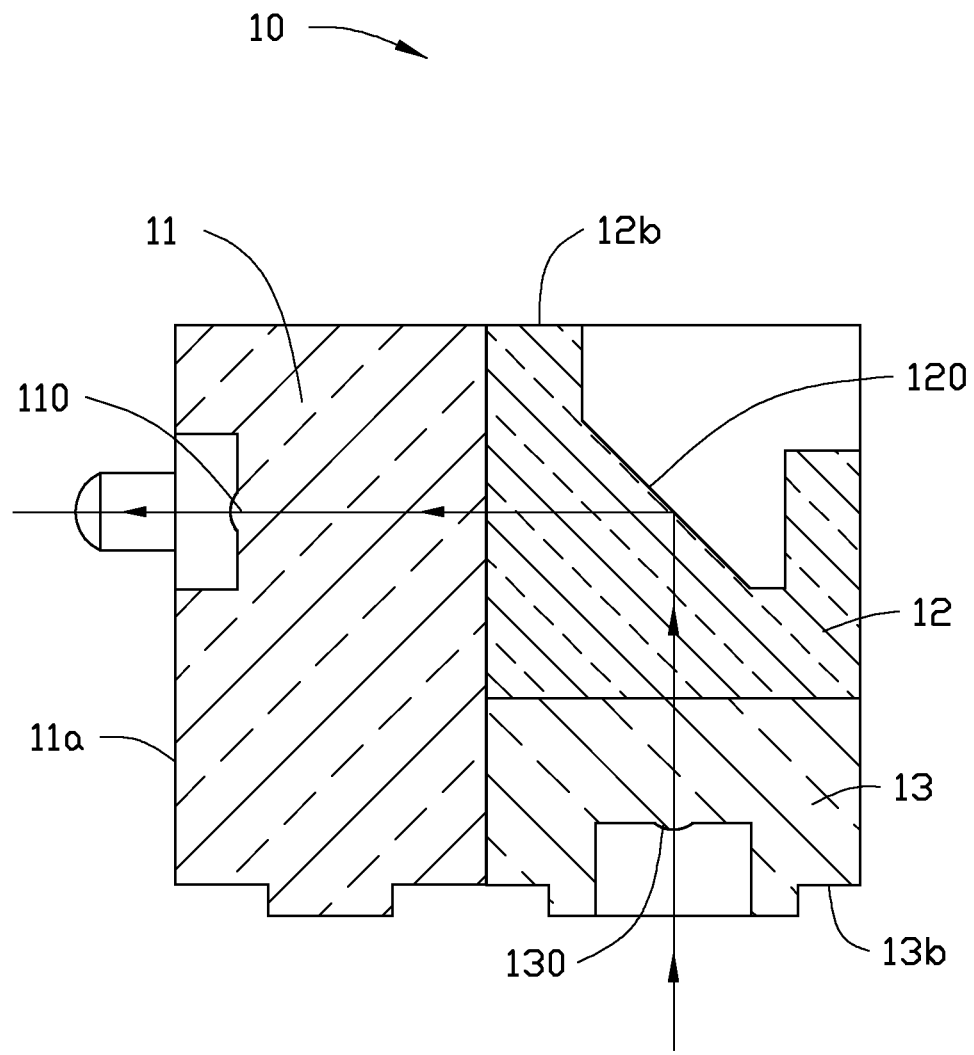
FIG. 4 is a cross-sectional view taken along line IV-IV of FIG. 1.

Referring to FIGS. 1 to 4, a lens module 10, according to an exemplary embodiment, is shown. The lens module 10 includes a front lens unit 11, a reflective unit 12, and a bottom lens unit 13. The front lens unit 11, the reflective unit 12, and the bottom lens unit 13 are detachably connected to each other.

The front lens unit 11 is configured for coupling to optical fibers, the reflective unit 12 is configured for reflecting light, and the bottom lens unit 13 is configured for coupling to electric-optical elements (not shown). The electric-optical elements include light-emitting elements and light receiving elements.

The front lens unit 11 includes a first surface 11a and a second surface 11b opposite to the first surface 11a. A plurality of first lenses 110 is arranged on the first surface 11a, and two front locating elements 111 are located on the second surface 11b. Each of the first lenses 110 is coupled to one optical fiber. The optical axes of the first lenses 110 are parallel to each other. The front locating elements 111 attach the front lens unit 11 to the reflective unit 12. In this embodiment, the front locating elements 111 are holes. In other embodiments, the front locating elements 111 can be posts.

The reflective unit 12 includes a third surface 12a, a fourth surface 12b, and a fifth surface 12c. The third surface 12a is perpendicular to the fourth surface 12b. The third surface 12a is also perpendicular to the fifth surface 12c. The fourth surface 12b is parallel to the fifth surface 12c. A reflecting surface 120 obliquely extends from the fourth surface 12b towards the fifth surface 12c. An angle between the reflecting surface 120 and the fourth surface 12b is about 45 degrees. Two first locating elements 121 are located on the third surface 12a, and two second locating elements 122 are located on the fifth surface 12c. The first locating elements 121 are posts, and are received by the front locating elements 111. The second locating elements 122 attach the reflective unit 12 to the bottom lens unit 13. In other embodiments, the first locating elements 121 can be holes. The second locating elements 122 are holes, but can be posts in other embodiments.

The bottom lens unit 13 includes a sixth surface 13a and a seventh surface 13b opposite to the sixth surface 13a. Two bottom locating elements 131 are located on the sixth surface 13a. The bottom locating elements 131 are posts, and are received by the second locating elements 122 to attach the reflective unit 12 to the bottom lens unit 13. A plurality of second lenses 130 is arranged on the seventh surface 13b. The optical axes of the second lenses 130 are all parallel to each other. A number of the second lenses 130 is equal to a number of the first lenses 110. The alignment of the second lenses 130 is the same as the alignment of the first lenses 110. The optical axes of the first lenses 111 is perpendicular to the optical axes of the second lenses 130. The bottom locating elements 131 are posts, but can be holes in other embodiments.

Light emitted from the light-emitting elements shine into the bottom lens unit 13 through the second lenses 130. The light passes through the bottom lens unit 13 and shines onto the reflecting surface 120 of the reflective unit 12. The light is bent 90 degrees by the reflecting surface 120, and then enters into the front lens unit 11. Finally, the light exits from the first lenses 110 of the front lens unit 11.

Light entering from the first lenses 110 shines into the front lens unit 11, and is reflected by the reflecting surface 120 of the reflective unit 12. The reflected light enters into the bottom lens unit 13. The light receiving elements receive the light exiting from the second lenses 130 of the bottom lens unit 13. The reflecting surface 120 bends the light 90 degrees.

Figure 5:
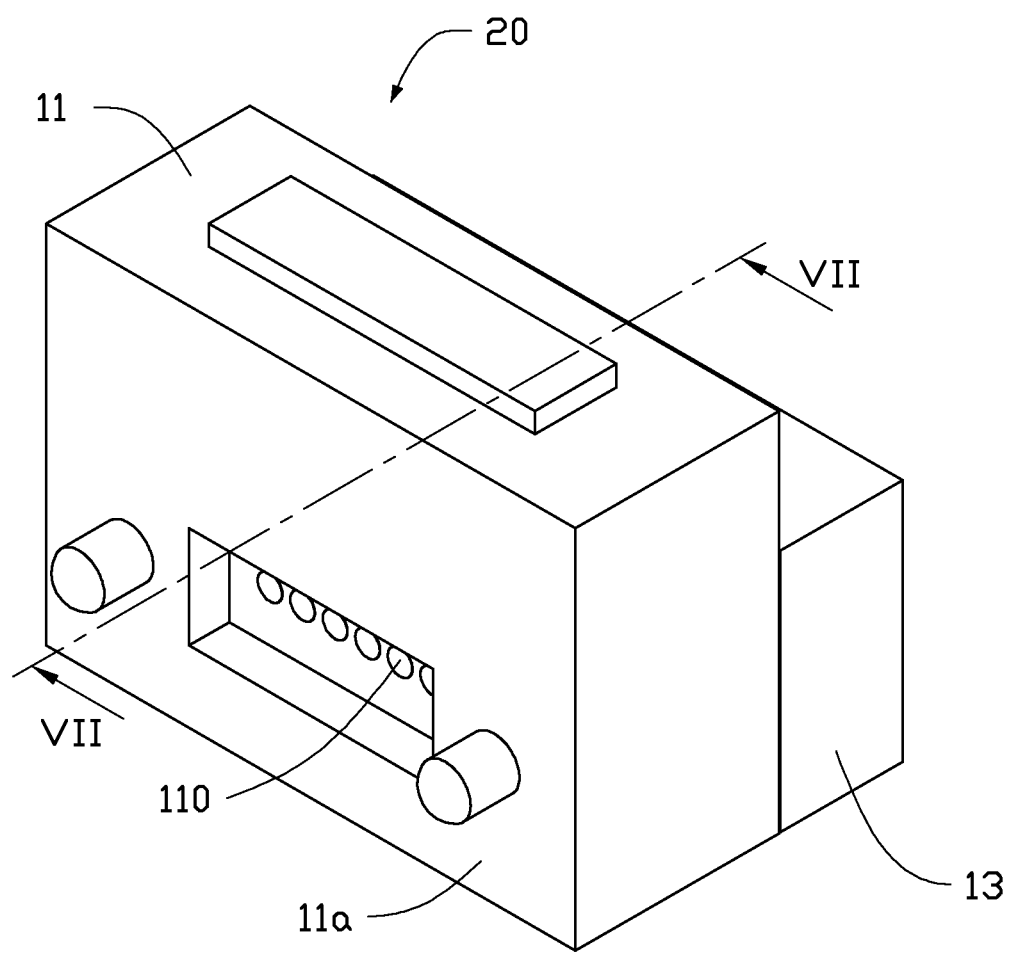
FIG. 5 an assembled schematic view of a lens module, according to another exemplary embodiment.
Figure 6:
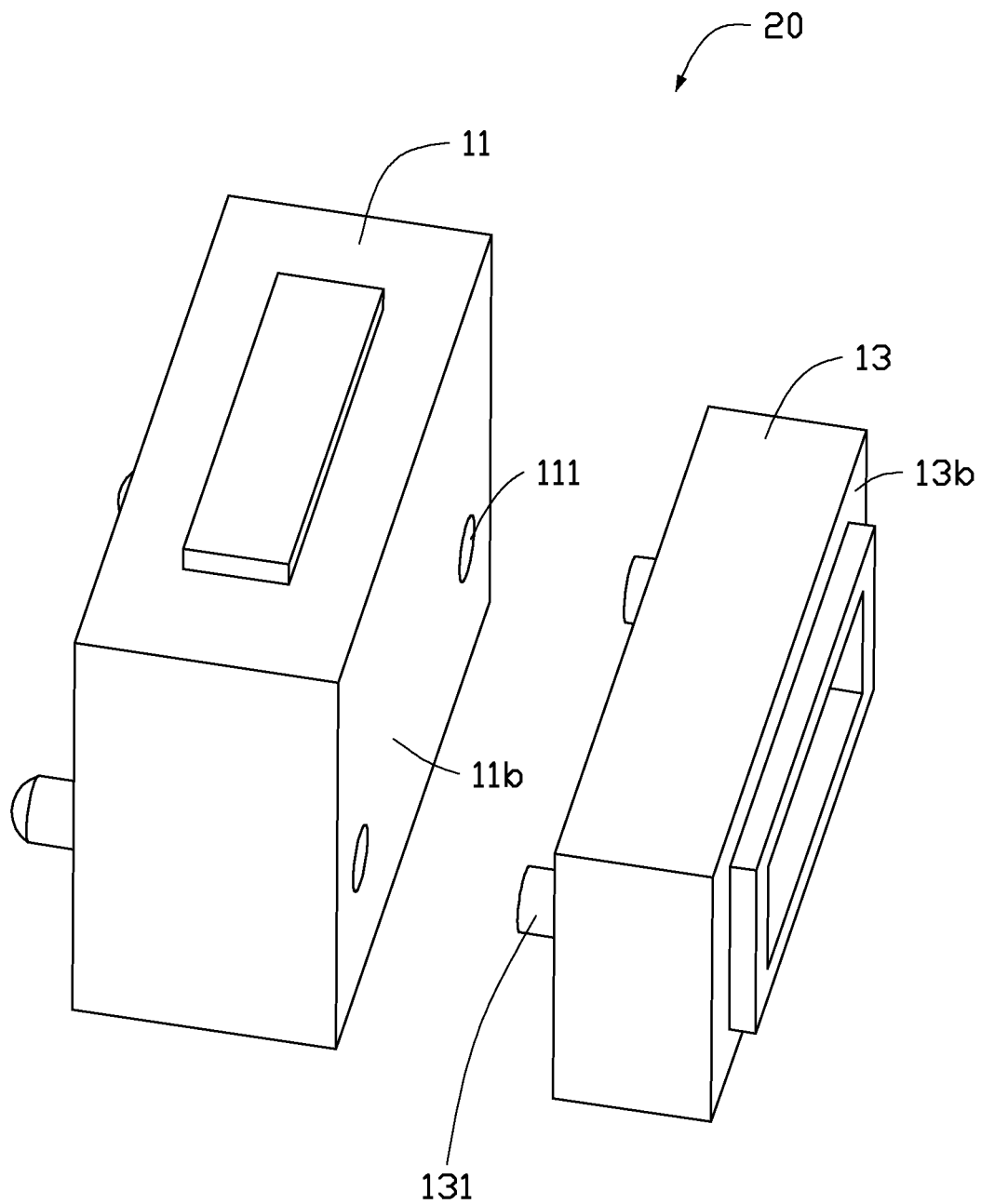
FIG. 6 is an exploded view of FIG. 5.
Figure 7:
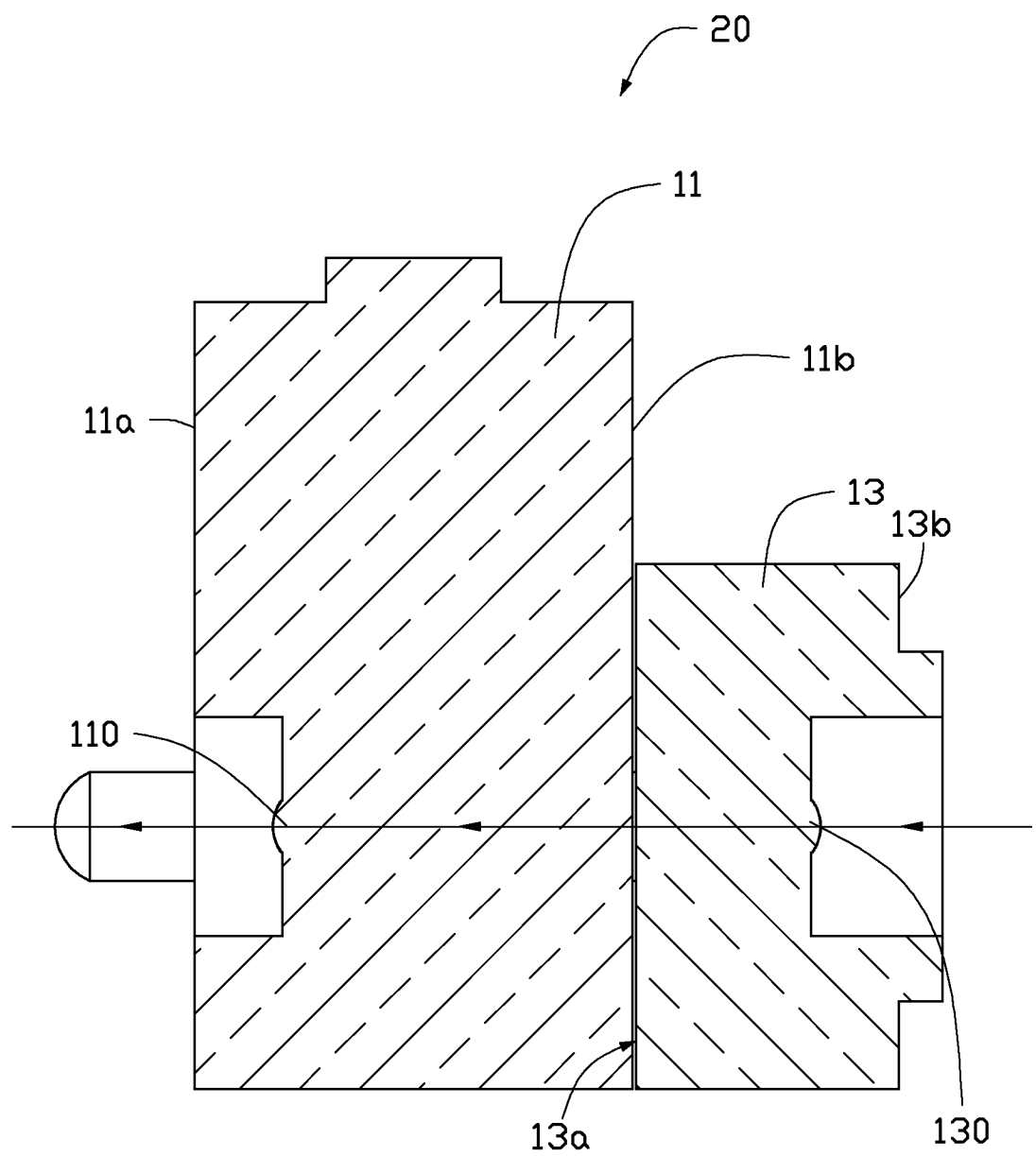
FIG. 7 is a cross-sectional view taken along line VII-VII of FIG. 5.

Referring to FIGS. 5-7, another lens module 20, according to another exemplary embodiment, is shown. The lens module 20 includes the front lens unit 11 and the bottom lens unit 13. The lens module 20 is a direct type lens.

The front locating elements 111 of the front lens unit 11 receive the bottom locating elements 131 of the bottom lens unit 13, to attach the front lens unit 11 to the bottom lens unit 13. Light emitted from the light-emitting elements passes through the second lenses 130 of the bottom lens unit 13 and exits from the first lenses 110 of the front lens unit 11. Light entering through the first lenses 110 of the front lens unit 11 passes through the bottom lens unit 13 and then exits from the second lenses 130. The light receiving elements receive the light exiting from the second lenses 130 of the bottom lens unit 13. For the above description, the direction of the light is not changed.

The front lens unit 11, the reflective unit 12, and the bottom lens unit 13 are separately made, and are easily assembled together, so a manufacturing process of the lens modules is simplified.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A lens module, comprising:
a front lens unit comprising a plurality of first lenses, the first lenses having parallel optical axes;
a bottom lens unit detachably and directly connected to the front lens unit, the bottom lens unit comprising a plurality of second lenses, the second lenses having parallel optical axes, bottom surfaces of the front lens unit and the bottom lens unit coplanar to each other; and
a reflective unit detachably connected to the front lens unit and the bottom lens unit, the reflective unit comprising a reflecting surface, the optical axes of the first lenses and the optical axes of the second lenses intersecting on the reflecting surface.

2. The lens module of claim 1, wherein the front lens unit comprises a front locating element, the bottom lens unit comprises a bottom locating element, the reflective unit comprises a first locating element and a second locating element, the first locating element is engaged with the front locating element to secure the front lens unit to the reflective unit, and the second locating element is engaged with the bottom locating element to secure the reflective unit to the bottom lens unit.

3. The lens module of claim 2, wherein both the front locating element and the second locating element are holes, both the first locating element and the bottom locating element are posts.

* * * * *